US012638753B2

(12) United States Patent
Xi et al.

(10) Patent No.: US 12,638,753 B2
(45) Date of Patent: May 26, 2026

(54) UNDERWATER PHOTOGRAPHIC DEVICE

(71) Applicant: Chasing-Innovation Technology Co., Ltd., Shenzhen (CN)

(72) Inventors: Zhiping Xi, Shenzhen (CN); Guofeng Zhong, Shenzhen (CN); Wenqian You, Shenzhen (CN)

(73) Assignee: Chasing-Innovation Technology Co., Ltd., Shenzhen (CN)

( * ) Notice: Subject to any disclaimer, the term of this patent is extended or adjusted under 35 U.S.C. 154(b) by 37 days.

(21) Appl. No.: 18/739,351

(22) Filed: Jun. 11, 2024

(65) Prior Publication Data

US 2025/0306436 A1     Oct. 2, 2025

(30) Foreign Application Priority Data

Mar. 26, 2024     (CN) .......................... 202410364312.4

(51) Int. Cl.
  *G03B 17/08*     (2021.01)
  *A01K 85/00*     (2006.01)
  (Continued)

(52) U.S. Cl.
  CPC .............. *G03B 17/08* (2013.01); *A01K 85/00* (2013.01); *A01K 97/00* (2013.01); *H04N 23/51* (2023.01);
  (Continued)

(58) Field of Classification Search
  CPC ........ A01K 97/00; A01K 85/00; G03B 17/02; G03B 17/08; G03B 17/56; G03B 17/561;
  (Continued)

(56) References Cited

U.S. PATENT DOCUMENTS

| | | | | |
|---|---|---|---|---|
| 7,920,163 B1* | 4/2011 | Kossin | ................... | H04N 23/51 |
| | | | | 396/25 |
| 2016/0178993 A1 | 6/2016 | Bianciardi | | |
| 2017/0042136 A1* | 2/2017 | Anderson | .............. | H04N 23/50 |

FOREIGN PATENT DOCUMENTS

| | | |
|---|---|---|
| CN | 209134521 U | 7/2019 |
| CN | 216211127 U | 4/2022 |

(Continued)

OTHER PUBLICATIONS

Office Action dated Jul. 19, 2024 from Corresponding Chinese Application No. 202410364312.4.

*Primary Examiner* — Twyler L Haskins
*Assistant Examiner* — Akshay Trehan

(57)     ABSTRACT

An underwater photographic device includes a housing, a transparent window, a magnetic switch, a camera, a battery assembly and a control assembly. The housing defines an accommodation chamber. The housing is a single piece and has opposite first and second ends, and the second end has an opening. The transparent window is disposed at the opening of the housing and seals the accommodation chamber. The magnetic switch is slidably provided on an outside of the housing. The camera, the battery assembly and the control assembly are arranged in the accommodation chamber and the control assembly is electrically connected to the camera and the battery assembly. The control assembly includes at least one Hall sensor, and the Hall sensor is configured to output level signals to the control assembly according to sensed changes in magnetic field caused by changes in position of the magnetic switch.

20 Claims, 11 Drawing Sheets

(51) Int. Cl.

| | |
|---|---|
| *A01K 97/00* | (2006.01) |
| *G03B 7/26* | (2021.01) |
| *G03B 30/00* | (2021.01) |
| *H04N 23/50* | (2023.01) |
| *H04N 23/51* | (2023.01) |
| *H04N 23/52* | (2023.01) |
| *H04N 23/54* | (2023.01) |
| *H04N 23/55* | (2023.01) |
| *H04N 23/56* | (2023.01) |
| *H04N 23/57* | (2023.01) |
| *H04N 23/65* | (2023.01) |

(52) U.S. Cl.
CPC ............. *H04N 23/52* (2023.01); *H04N 23/54* (2023.01); *H04N 23/55* (2023.01); *H04N 23/555* (2023.01); *H04N 23/56* (2023.01); *H04N 23/57* (2023.01); *H04N 23/65* (2023.01); *G03B 7/26* (2013.01); *G03B 30/00* (2021.01); *G03B 2217/007* (2013.01)

(58) Field of Classification Search
CPC ............ G03B 17/566; G03B 2217/002; G03B 2217/007; G03B 30/00; G03B 7/26; H04N 23/50; H04N 23/51; H04N 23/52; H04N 23/54; H04N 23/55; H04N 23/555; H04N 23/57; H04N 23/65; H04N 23/651; H04N 25/709
See application file for complete search history.

(56) References Cited

FOREIGN PATENT DOCUMENTS

| | | | |
|---|---|---|---|
| CN | 216356955 | U | 4/2022 |
| CN | 216451448 | U | 5/2022 |
| JP | 2015175879 | A | 10/2015 |
| KR | 101822096 | B1 | 1/2018 |

* cited by examiner

UNDERWATER PHOTOGRAPHIC DEVICE

CROSS-REFERENCE TO RELATED APPLICATIONS

The present application claims priority of Chinese Patent Application No. 202410364312.4, filed on Mar. 26, 2024, the entire contents of which are hereby incorporated by reference.

TECHNICAL FIELD

The present disclosure relates to an underwater photographic device.

DESCRIPTION OF THE PRIOR ART

In order to see the underwater activities of fishes and the scenes of chasing and biting bait while fishing, people invented a visual fishing equipment, which includes an underwater photographic device that can transmit the underwater scenes through a wired or wireless process to a visual device to show the underwater scenes so that the fisherman can observe the underwater scenes in real time. The fishing photographic device generally includes a housing and an end cap. To activate the device, the end cap must be removed to expose the charging interface, data interface, operation buttons, etc. for operation. However, the hands of the fisherman are usually wet during operation, and it is easy to introduce water droplets when removing the end cap for operation. In addition, since the underwater photographic device is used underwater, the end cap designed for sealing purpose has limited underwater pressure resistance, and when used in deep water areas where the water pressure is high, the photographic device is prone to water ingress, causing damage to the electronic components and product failure.

SUMMARY OF THE DISCLOSURE

In order to solve the above problems, the present disclosure provides an underwater photographic device that includes a sing-piece housing and a sensor switch to improve waterproof performance and optimize the photographic effect.

In order to achieve the above object, the present disclosure provides an underwater photographic device, which includes a housing, a transparent window, a magnetic switch, a camera, a battery assembly, and a control assembly. The housing defines an accommodation chamber. The housing is a single piece and has opposite first and second ends, and the second end has an opening. The transparent window is disposed at the opening of the housing and configured to seal the accommodation chamber. The magnetic switch is slidably provided on an outside of the housing. The camera is arranged in the accommodation chamber and adjacent to the opening. The battery assembly is arranged in the accommodation chamber. The control assembly is arranged in the accommodation chamber and electrically connected to the camera and the battery assembly, the control assembly includes at least one Hall sensor, and the Hall sensor is configured to output level signals to the control assembly according to sensed changes in magnetic field caused by changes in position of the magnetic switch.

In some embodiments, the magnetic switch includes a slider and a magnet arranged on the slider, and the at least one Hall sensor consists of one Hall sensor which is configured to output level signals to the control assembly according to sensed changes in magnetic field caused by changes in position of the magnetic switch.

In some embodiments, the magnetic switch includes a slider and a magnet arranged on the slider, and the at least one Hall sensor consists of at least two Hall sensors which are configured to output level signals to the control assembly according to sensed changes in magnetic field caused by changes in position of the magnetic switch respectively.

In some embodiments, the magnetic switch includes a slider and a first magnet and a second magnet arranged sequentially in a sliding direction of the slider, the first magnet and the second magnet have opposite polarities, and the at least one Hall sensor consists of one Hall sensor which is configured to output level signals to the control assembly according to sensed changes in magnetic field caused by changes in polarity of the magnetic switch.

In some embodiments, the magnetic switch includes a slider and a first magnet and a second magnet arranged sequentially in a sliding direction of the slider, the first magnet and the second magnet have opposite polarities, and the at least one Hall sensor consists of at least two Hall sensors which are configured to output level signals to the control assembly according to sensed changes in magnetic field caused by changes in polarity of the magnetic switch respectively.

In some embodiments, a connector is fixedly connected to the outside of the housing and configured to limit the magnetic switch, and the magnetic switch is slidable relative to the housing and the connector.

In some embodiments, a first groove is defined on a side of the connector opposite to the outside of the housing for accommodating the magnetic switch, the magnetic switch defines a second groove extending in a longitudinal direction of the housing and extending through the magnetic switch in the longitudinal direction of the housing, the magnetic switch has a length shorter than that of the first groove, and a bottom edge of the connector corresponding to the first groove is embedded in the second groove of the magnetic switch so that the magnetic switch is slidable in the first groove.

In some embodiments, the magnetic switch is provided with an elastic protrusion on a bottom wall of the second groove, the connector is provided with limiting recesses on a bottom wall of the first groove, the limiting recesses has a quantity greater than that of the Hall sensor, and positions of the limiting recesses correspond to preset positions of the magnetic switch for triggering the Hall sensor.

In some embodiments, the underwater photographic device further includes a bracket, a receiving chamber is defined in the bracket, and the camera, the control assembly and the battery assembly are installed in the receiving chamber of the bracket and thus form a pre-assembled unit with the bracket.

In some embodiments, the bracket includes a first bracket part and a second bracket part snapped with each other and defining the receiving chamber, and the camera, the control assembly and the battery assembly are sequentially arranged in the receiving chamber in an axial direction of the bracket.

In some embodiments, the underwater photographic device further includes a screw, the screw being an exhaust screw, and the exhaust screw passing through the first end of the housing and fixedly connected to a corresponding end of the bracket.

In some embodiments, the transparent window is snap-connected to an other end of the bracket.

In some embodiments, the transparent window is snap-connected to the second end of the housing.

In some embodiments, a first sealing member is provided between the bracket and the housing; a second sealing member is provided between the housing and the transparent window, and a third sealing member is provided between the exhaust screw and the bracket.

In some embodiments, the housing is bullet-shaped and has fins on opposite sides of an outer surface thereof.

In some embodiments, the control assembly includes a main circuit board and an auxiliary circuit board arranged in parallel and spaced apart in a radial direction of the bracket, the main circuit board and the auxiliary circuit board are electrically connected, the camera and the Hall sensor are electrically connected to the main control circuit board, and the battery assembly is electrically connected to the auxiliary circuit board.

In some embodiments, the camera includes a lens and a light board disposed between the lens and the transparent window, the light board is electrically connected to the main circuit board, the light board is provided with a fill light and an indicator light, a shielding member is provided between the light board and the transparent window, the shielding member is provided with light-transmitting holes corresponding to the fill light and the indicator light to allow light from the fill light and the indicator light to pass through.

In some embodiments, the battery assembly is a wireless charging assembly and includes a charging receiving coil assembly and a battery, and the charging receiving coil assembly and the battery are respectively electrically connected to the auxiliary circuit board so that the charging receiving coil assembly is allowed to charge the battery.

In some embodiments, the underwater photographic device further includes a charging base, and a charging circuit board, a charging transmitting coil assembly, and a charging interface being provided in the charging base, wherein the charging transmitting coil assembly and the charging interface are electrically connected to the charging circuit board, and a power end of the charging transmitting coil assembly is configured to be connected to an external power supply through the charging interface; and the charging base defines a receiving groove on a surface thereof for receiving the housing, the charging transmitting coil assembly is configured to cooperate with the charging receiving coil assembly of the battery assembly, and the charging receiving coil assembly is configured to sense electromagnetic signals transmitted by the charging transmitting coil assembly to charge the battery.

In the underwater photographic device according to the embodiments of the present disclosure, the housing is a single piece, and the accommodation chamber of the housing is sealed through a transparent window to form a sealed chamber. There is no need to make holes or slots to connect the accommodation chamber with the external environment, thereby ensuring the sealing performance of the accommodation chamber, preventing damage to internal electronic components caused by water seepage, and improving the waterproof performance. Further, the Hall sensor and the magnetic switch are used to realize the turning on/off of the device, video recording and other operations, without the need for buttons. Instead of button triggering, sensor triggering is used. The waterproof performance is greatly enhanced, and the device is easy to operate, with high reliability and long life.

DESCRIPTION OF EMBODIMENTS

The technical solutions of the present disclosure will be clearly and completely described below with reference to the accompanying drawings. Apparently, the described embodiments are some, not all, of the embodiments of the present disclosure. Based on the embodiments of the present disclosure, all other embodiments obtained by those skilled in the art without creative efforts fall within the scope of protection of the present disclosure.

In the description of the present disclosure, it should be noted that the terms indicating orientation or positional relationships, such as "center", "upper", "lower", "left", "right", "vertical", "horizontal", "inner", "outer", etc., refer to the orientation or positional relationships shown in the figures. They are only for the convenience of description and simplifying the description, but not to indicate or imply that the device or element referred to must have a specific orientation or be configured and operated in a specific orientation, and therefore should not be construed as limitations of the disclosure. Furthermore, the terms "first", "second" and "third" are only for the convenience of description and are not to be construed as indicating or implying relative importance.

In the description of the present disclosure, it should be noted that, unless otherwise clearly stated and limited, the terms "install", "connected" and "connection" should be understood in a broad sense. For example, the connection can be a fixed connection or a detachable connection. The connection can be an integrated connection, a mechanical connection, an electrical connection, a direct connection, an indirect connection through an intermediate medium, or an internal communication between two components. For those skilled in the art, the specific meanings of the above terms in the present disclosure can be understood on a case-by-case basis.

Figure 1:
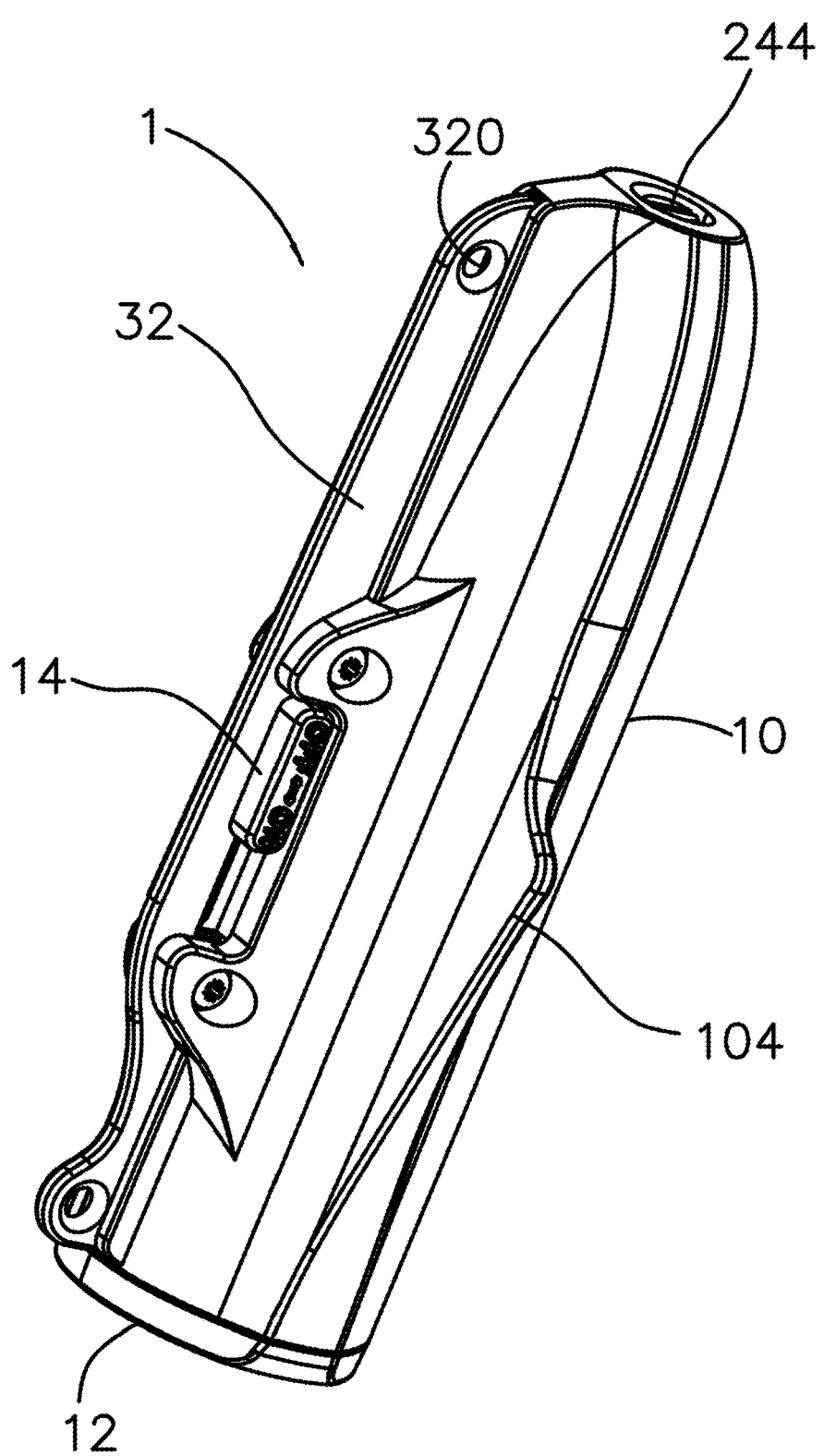
FIG. 1 is a perspective view of an underwater photographic device according to a first embodiment.
Figure 2:
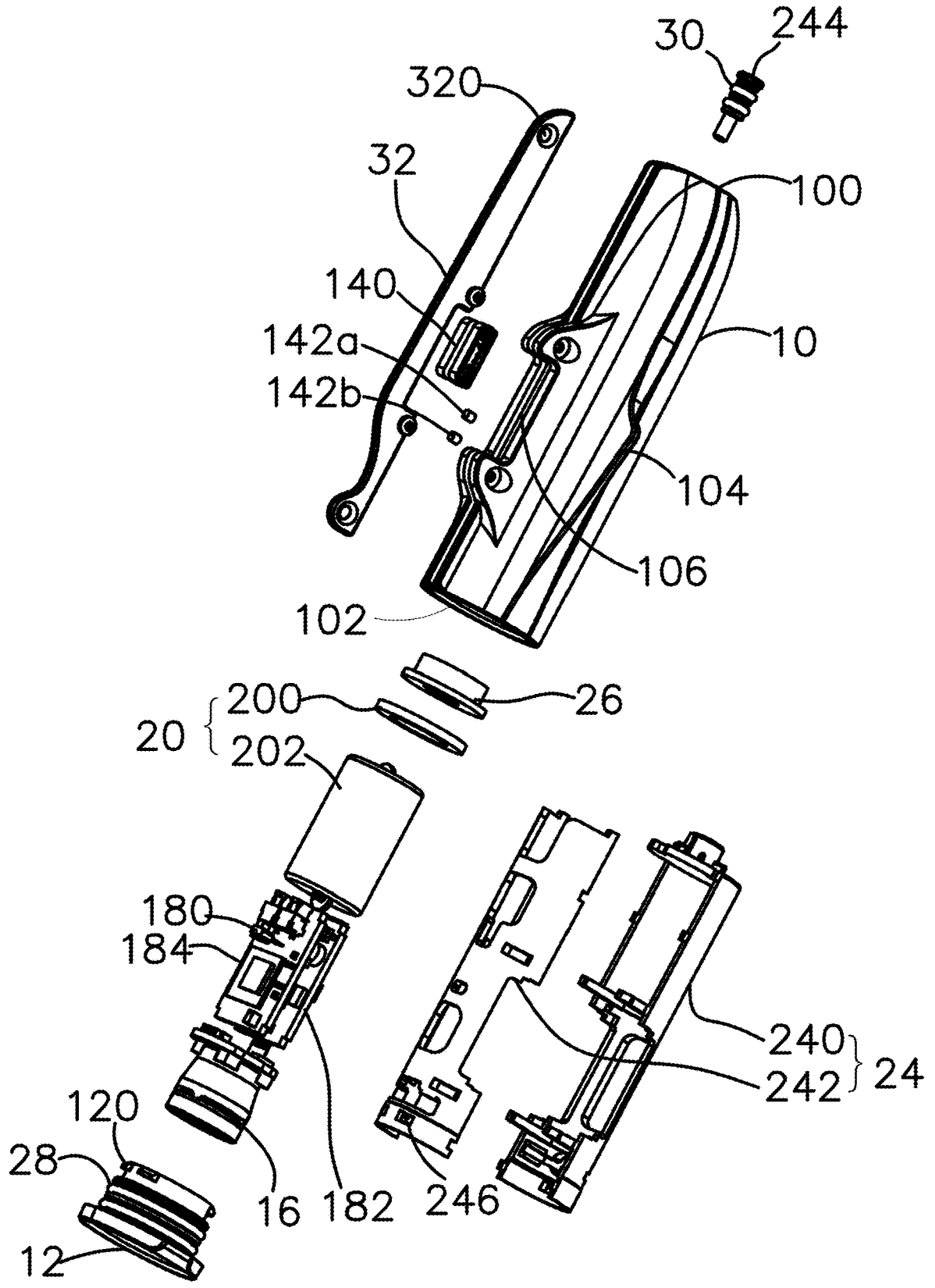
FIG. 2 is an exploded view of the underwater photographic device in FIG. 1.
Figure 3:
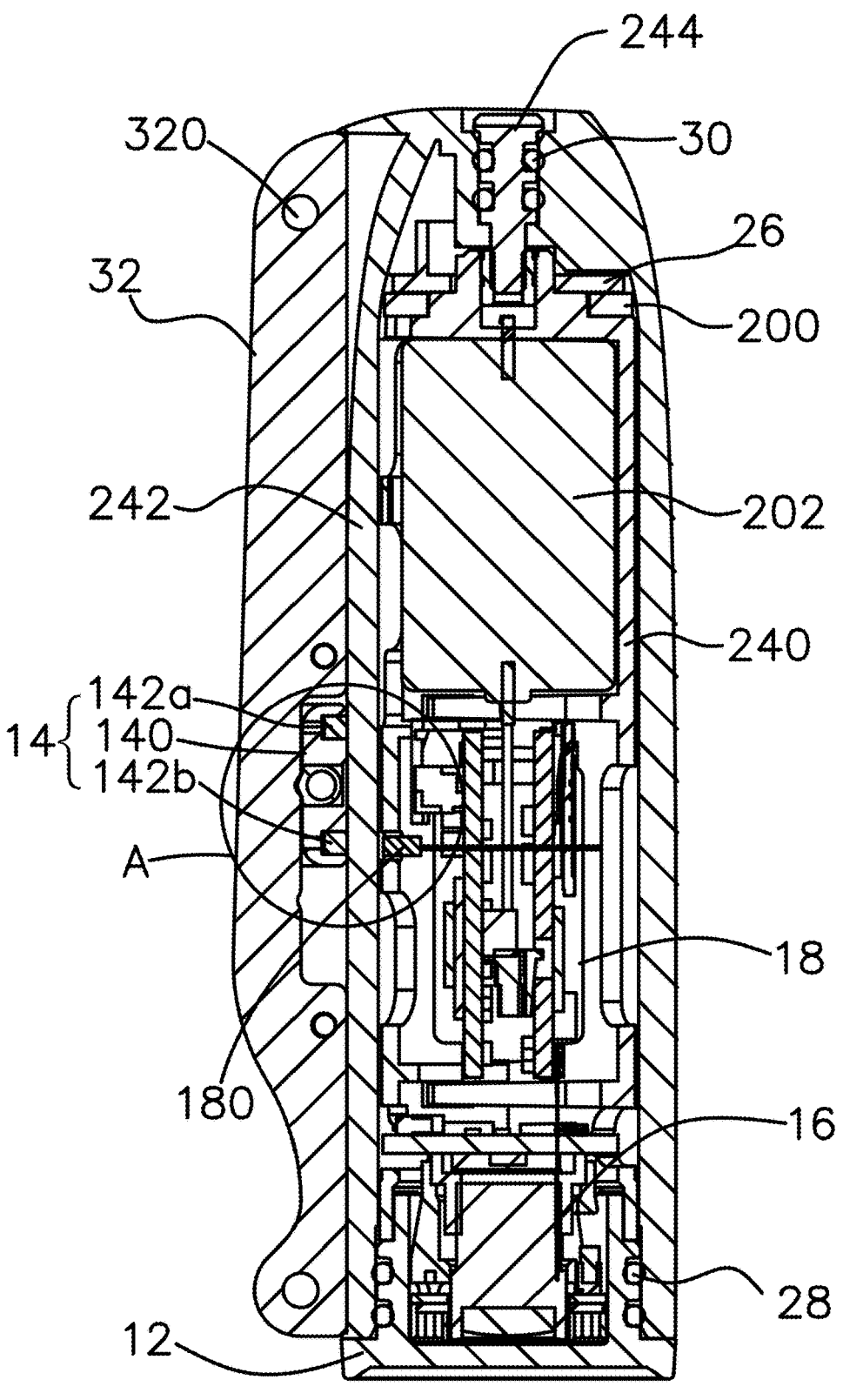
FIG. 3 is a cross-sectional view of the underwater photographic device in FIG. 1 in the axial direction of the housing.

FIGS. 1 to 3 show an underwater photographic device 1 according to a first embodiment of the present disclosure. The underwater photographic device 1 includes a housing 10, a transparent window 12 installed on the housing 10, a magnetic switch 14, a camera 16, a control assembly 18 and a battery assembly 20. The camera 16 and the battery assembly 20 are electrically connected to the control assembly 18 through wires. The magnetic switch 14 is slidably disposed outside the housing 10 and outputs level signals to the control assembly 18 according to changes in magnetic field caused by changes in position.

Figure 4:
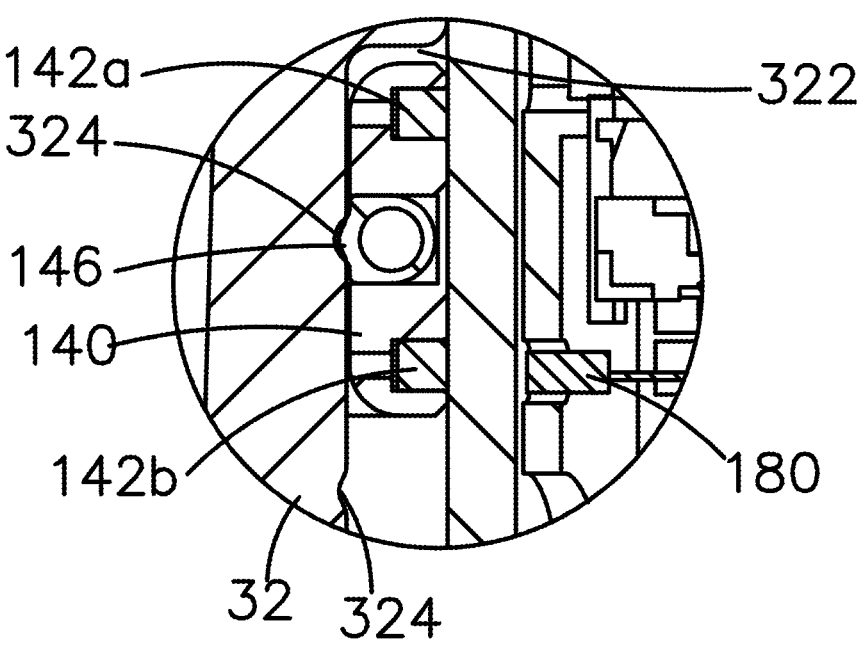
FIG. 4 is an enlarged view of portion A in FIG. 3.

As shown in FIG. 4, the magnetic switch 14 includes a slider 140, a first magnet 142a and a second magnet 142b sequentially arranged in the sliding direction of the slider 140. The first magnet 142a and the second magnet 142b have opposite polarities. The slider 140 can slide relative to the housing 10 to switch between a first position and a second position, thereby driving the two magnets 142a and 142b to slide together to cause changes in magnetic field. The control assembly 18 includes a Hall sensor 180. The Hall sensor 180 senses the changes in the magnetic field caused by the polarity change of the magnetic switch 14 and outputs corresponding level signals to the control assembly 18.

Preferably, the control assembly 18 further includes a switch circuit. The Hall sensor 180 serves as a switch of the switch circuit. The switch circuit is opened or closed according to the changes in the position of the magnetic switch 14 sensed by the Hall sensor 180, thereby turning on or off the underwater photographic device 1.

Optionally, the control assembly 18 further includes other circuits, such as lighting circuits and shooting circuits, which are also opened or closed according to the changes in the position of the magnetic switch 14 sensed by the Hall sensor 180, so that the underwater photographic device 1 can realize recording, lighting, shooting, and transmitting data among others.

The housing 10 is a single piece, which defines an accommodation chamber. The housing 10 has a first end 100 and an opposing second end 102 (see FIG. 2). The first end 100 is sealed, and the second end 102 has an opening. The transparent window 12 is disposed at the opening of the housing 10 and seals the accommodation chamber to form a sealed chamber.

Preferably, the underwater photographic device 1 of the present disclosure further includes a bracket 24. The bracket 24 includes a first bracket part 240 and a second bracket part 242 that are snapped with each other to form a receiving chamber. The camera 16, the control assembly 18 and the battery assembly 20 are sequentially installed in the receiving chamber in the axial direction of the bracket 24 to form a pre-assembled unit with the bracket 24, making the overall structure more compact, convenient for assembly and disassembly, and improving the installation stability of the components. The camera 16 is disposed adjacent the opening of housing 10. The first end 100 of the housing 10 is fixedly connected to the corresponding end of the bracket 24 through a screw, and the screw is preferably an exhaust screw 244 to seal the first end 100 of the housing 10.

The exhaust screw 244 can adjust the pressure in the sealed chamber relative to the external environment when the temperature of the external environment changes, causing thermal expansion and contraction of the gas in the sealed chamber. When the external environment temperature is high, the air in the housing 10 expands, and the exhaust screw 244 can exhaust the air to balance the internal and external air pressure, thereby preventing the transparent window 12 from being pushed away due to air expansion, improving the reliability of the underwater photographic device 1.

In assembly of the underwater photographic device 1, the camera 16, the control assembly 18 and the battery assembly 20 are first installed in the bracket 24 to form a pre-assembled unit which is then installed into the housing 10, the exhaust screw 244 is screwed through the first end 100 of the housing 10 into the bracket 24, thereby firmly fixing the bracket 24 in the housing 10, improving the stability of the entire device, and then the transparent window 12 is installed at the opening of the housing 10 tightly, thereby sealing the accommodation chamber of the housing 10 to form the sealed chamber.

After assembly, when the underwater photographic device 1 is in use, the housing 10 cannot be opened without assistant of tools. In addition, the housing 10 has no buttons or slots connecting the accommodation chamber with the external environment, thereby ensuring the sealing of the accommodation chamber. The underwater photographic device 1 of the present disclosure has excellent waterproof performance, higher reliability, and long life.

Preferably, the transparent window 12 is snap-connected to the bracket 24. The transparent window 12 is provided with a plurality of snaps 120 distributed in the circumferential direction. The bracket 24 is provided with a plurality of slots 246 corresponding to the snaps 120, and the snaps 120 are correspondingly received in the slots 246. After assembly, the transparent window 12 and the bracket 24 are formed in one piece, and the transparent window 12 cannot be removed without loosening the exhaust screw 244. If the underwater photographic device 1 of the present disclosure needs to be disassembled for maintenance, only after the exhaust screw 244 located at the first end 100 of the housing 10 is screwed out, the transparent window 12 can be pulled out from the second end 102 of the housing 10 together with the bracket 24 and the camera 16, the control assembly 18 and the battery assembly 20 installed therein.

Alternatively, the transparent window 12 and the bracket 24 can be connected in a threaded or other detachable manner. Alternatively, the transparent window 12 can be detachably connected to the housing 10 (instead of the bracket 24), thereby installing the transparent window 12 and sealing the accommodation chamber.

Preferably, the housing 10 is bullet-shaped, and its outer surface is provided with fins 104 on opposite sides in the radial direction. The bullet-shaped structure and the stream-lined design of the fins 104 can reduce the resistance to the photographic device 1 when the photographic device 1 moves underwater, preventing the device from swaying due to the impact of water flow during fishing and thus improving the stability of fishing. When the underwater photographic device 1 moves in the water, the fins 104 can ensure the stability of the underwater photographic device 1, avoiding violent image shaking in the camera movement process and improving imaging quality.

The outer surface of the housing 10 is provided with a connector 32. Preferably, the connector 32 is located between the two fins 104 in the circumferential direction. Preferably, the connector 32 extends in the longitudinal direction of the housing 10 in order to reduce the resistance to the photographic device 1. Two ends of the connector 32 opposite to each other in the longitudinal direction are detachably connected to the housing 10 through fasteners or snaps.

Figure 6:
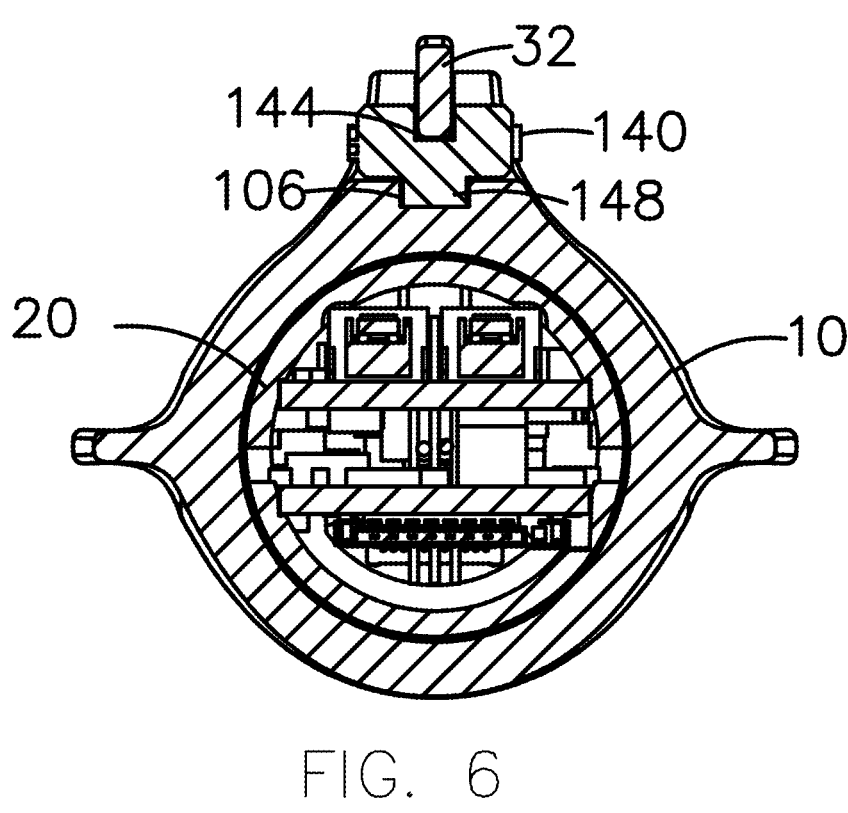
FIG. 6 is a cross-sectional view of the underwater photographic device in FIG. 1 in the radial direction of the housing.
Figure 7:
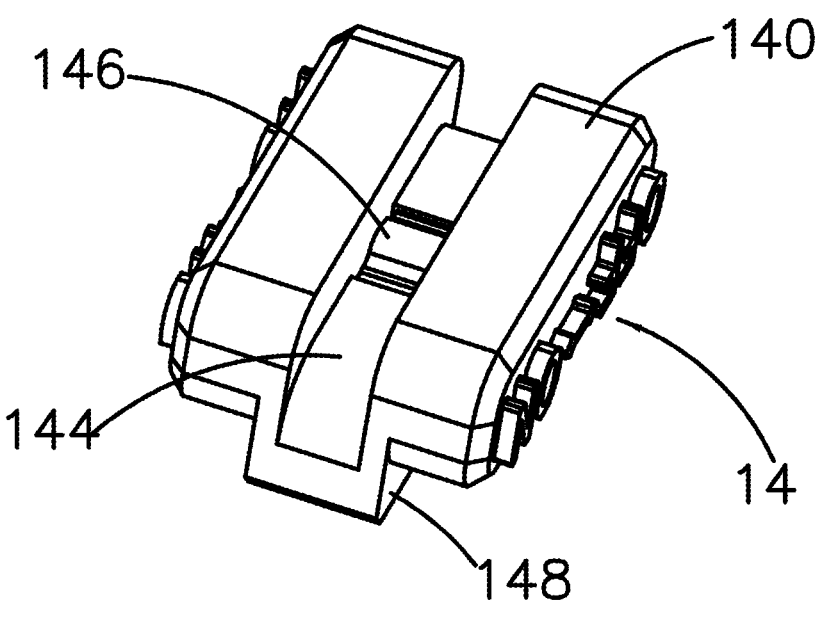
FIG. 7 is a perspective view of the magnetic switch shown in FIG. 2.
Figure 8:
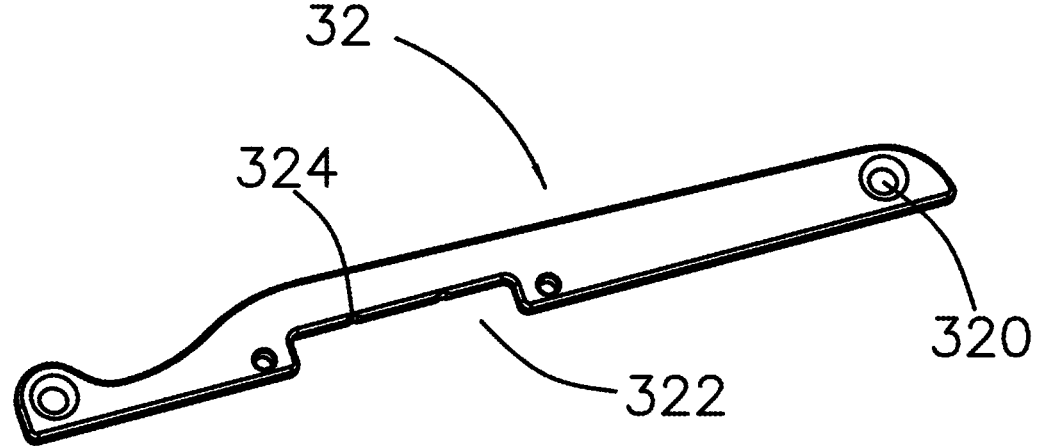
FIG. 8 is a perspective view of the connector shown in FIG. 2.

As shown in FIGS. 4 and 8, a first groove 322 is defined in the middle of the connector 32 on the side opposite to the outer surface of the housing 10 for accommodating the magnetic switch 14. As shown in FIGS. 6 and 7, the magnetic switch 14 defines a second groove 144 in the middle thereof in the circumferential direction of the housing 10. The second groove 144 extends through the entire length of the magnetic switch 14 in the longitudinal direction of the housing 10, and the length of the magnetic switch 14 is much smaller than the length of first groove 322. The bottom edge of the middle part of the connector 32 corresponding to the first groove 322 (i.e., the top of the first groove 322) is received in the second groove 144 of the magnetic switch 14, so that the magnetic switch 14 can slide longitudinally in the first groove 322 and switch between the first and second positions.

Preferably, the magnetic switch 14 is provided with an elastic protrusion 146 in the middle of the bottom of the second groove 144 thereof, and accordingly, the connector 32 is provided with two limiting recesses 324 in the middle thereof. The two limiting recesses 324 correspond to the two limit positions (i.e., the first position and the second position) of the magnetic switch 14 respectively, and the positions of the limiting recesses 324 correspond to preset positions of the magnetic switch 14 for triggering the Hall sensor 180. When the magnetic switch 14 slides in the first groove 322 to one limiting recess 324, the elastic protrusion 146 of the magnetic switch 14 is engaged in the limiting recess 324, thereby maintaining the reliable positioning of the magnetic switch 14 and avoiding slide of the magnetic switch 14 due to external force. When the position of the magnetic switch 14 needs to be switched, the magnetic switch 14 is pushed to move toward the other limiting recess 324, during which, the elastic protrusion 146 of the magnetic switch 14 is pressed and deformed by the bottom edge of the connector 32, until the magnetic switch 14 moves to the other limiting recess 324, thereby completing the position switching, now the elastic protrusion 146 restores its shape and is engaged in the other limiting recess 324, thereby achieving reliable positioning of the magnetic switch 14.

Preferably, the quantity of limiting recesses 324 is greater than the quantity of the Hall sensor 180, thereby meeting a plurality of triggering requirements for the Hall sensor 180.

Preferably, a concave-convex matching mechanism is provided between the slider 140 of the magnetic switch 14 and the outer surface of the housing 10. For example, the bottom of the slider 140 has a protrusion 148, and the outer surface of the housing 10 is recessed to form a guide groove 106. The protrusion 148 of the slider 140 is received in the guide groove 106 of the housing 10, and can slide in the guide groove 106 to the first or second position. The engagement between the protrusion 148 and the guide groove 106 further improves the stability of the magnetic switch 14 when it slides.

Preferably, the connector 32 is also used for threading the fishing line, and the connector 32 is provided with eyelets 320 for connection and fixation with the fishing line.

In order to prevent water seepage between the housing 10 and the transparent window 12, and between the housing 10 and the exhaust screw 244, and improve the waterproof performance, a first sealing member 26 (see FIGS. 2 and 3) is provided between the housing 10 and the bracket 24, and the exhaust screw 244 passes through the first end 100 of the housing 10, the first sealing member 26 in sequence and is screwed into the bracket 24. A second sealing member 28 is provided between the housing 10 and the transparent window 12. A third sealing member 30 is provided between the exhaust screw 244 and the bracket 24, and the third sealing member 30 surrounds the exhaust screw 244. The above-mentioned sealing members can be sealing rings, sealing gaskets, etc. of different shapes and specifications. Such waterproof structure is reliable, pressure-resistant and can withstand 250 m of underwater pressure.

The control assembly 18 includes a main circuit board 182 and an auxiliary circuit board 184 arranged in parallel and spaced apart in the radial direction of the bracket 24. Preferably, the main circuit board 182 is a circuit board with a CPU. The main circuit board 182 and the auxiliary circuit board 184 are electrically connected. The camera 16 and the Hall sensor 180 are electrically connected to the main circuit board 182, and the battery assembly 20 is electrically connected to the auxiliary circuit board 184. The arrangement of the two circuit boards parallel to each other in the radial direction can save space and make the device more compact.

Figure 5:
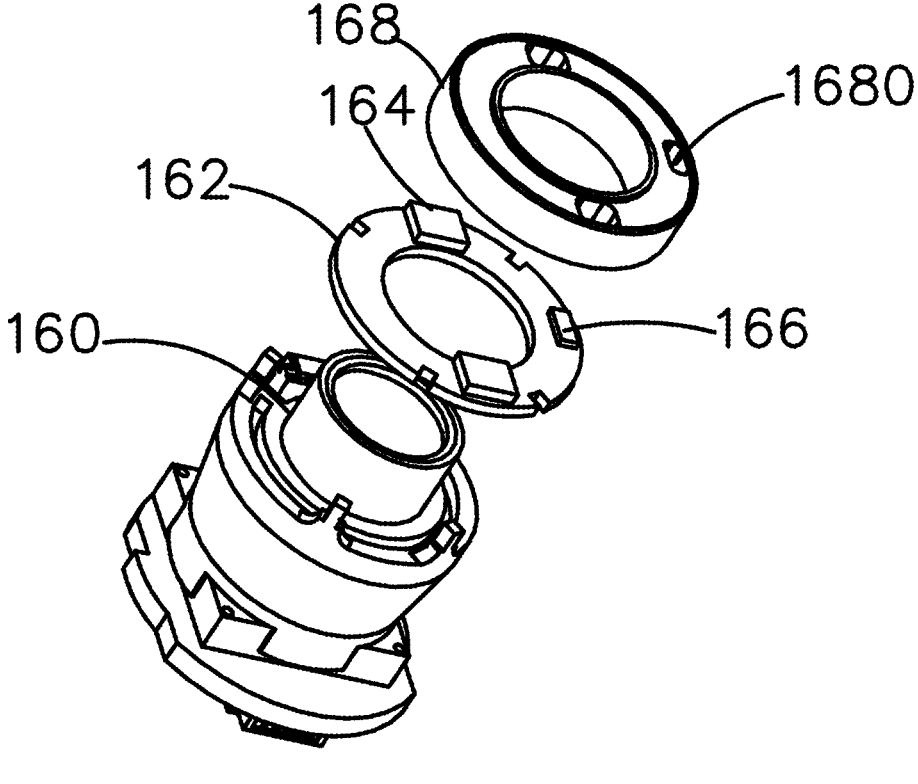
FIG. 5 is an exploded view of the camera shown in FIG. 2.

As shown in FIGS. 2 and 5, the camera 16 includes a lens 160 and a light board 162 disposed between the lens 160 and the transparent window 12. The light board 162 is electrically connected to the main circuit board 182. The light board 162 is provided with one or more fill lights 164 and one or more indicator lights 166. A shielding member 168 is provided between the light board 162 and the transparent window 12. The shielding member 168 is provided with light-transmitting holes 1680 corresponding to the fill light 164 and the indicator light 166 to allow the light from the fill light 164 and the indicator light 166 to pass through.

Preferably, the shielding member 168 is a light-shielding member. The light-transmitting hole 1680 can not only concentrate the light rays of the fill light 164 and the indicator light 166, avoid light dispersion, but also prevent the interior of the device from being visible from the outside through the transparent window 12 so that the device looks aesthetically pleasing.

The fill light 164 can automatically sense the intensity of light through the optical sensor in the camera 16. According to the intensity of the light, the fill light 164 can be automatically turned on or off, or the fill light 164 can be turned on manually. The fill light 164 and the indicator light 166 are preferably placed in front of the lens 160 of the camera 16. One or more indicator lights 166 can be provided, as stated above. Each indicator light 166 can be a monochromatic light or a multicolored light. The indicator light 166 can be used to indicate the recording status, battery status, power on/off status, etc.

The auxiliary circuit board 184 is provided with a wireless communication module. The wireless communication module is one of Bluetooth, WiFi, and GPRS. The wireless communication module enables remote control, remote data transmission among other operations of the underwater photographic device 1.

The battery assembly 20 is a wireless charging assembly, which includes a charging receiving coil assembly 200 and a storage battery 202 (see FIGS. 2 and 3). The charging receiving coil assembly 200 and the storage battery 202 are electrically connected to the auxiliary circuit board 184 respectively, so that the charging receiving coil assembly 200 can charge the storage battery 202. The wireless charging method prevents water seepage through a charging socket or other sockets.

Figure 9:
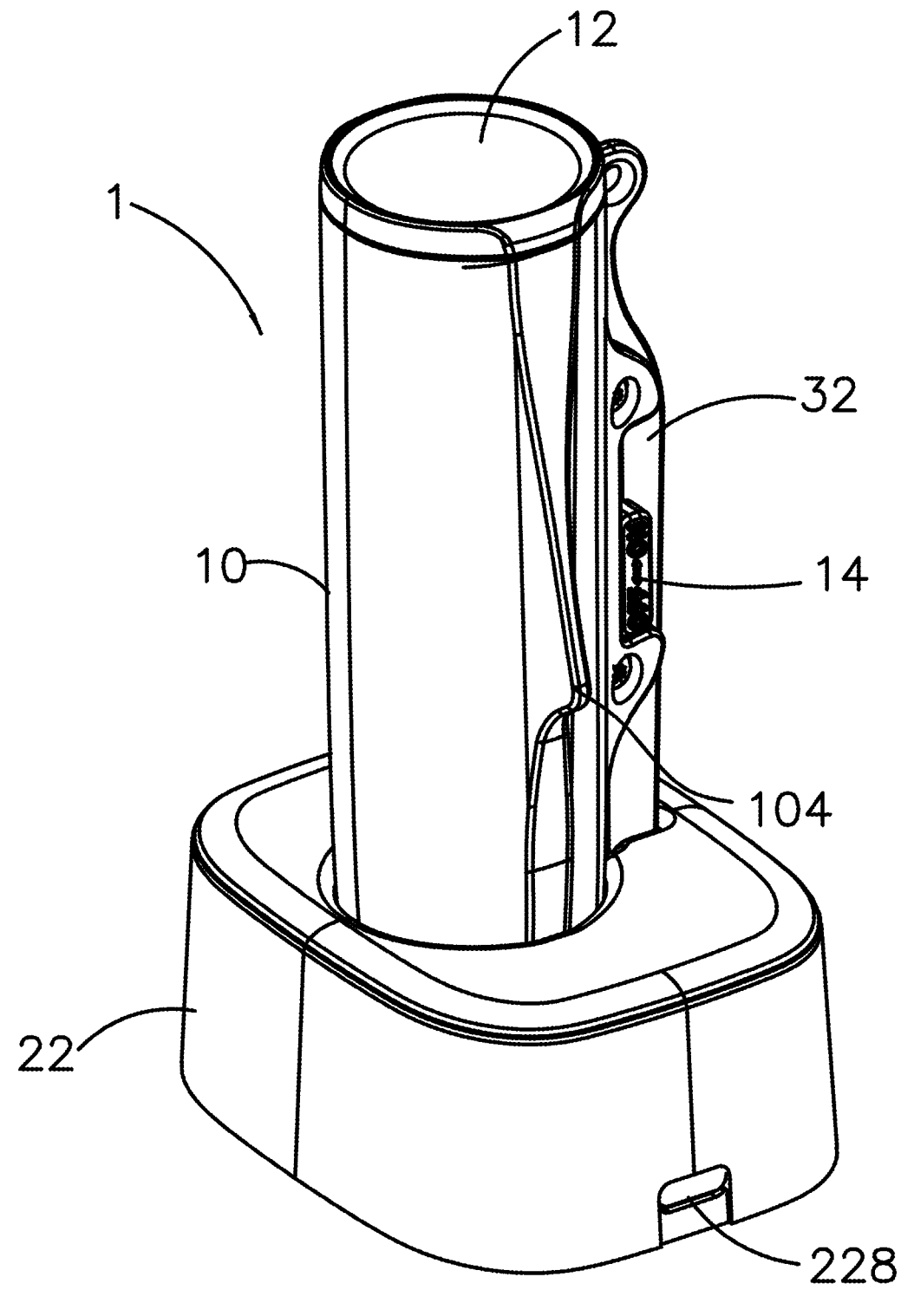
FIG. 9 is a perspective view of the underwater photographic device in FIG. 1 in connection with a charging base.
Figure 10:
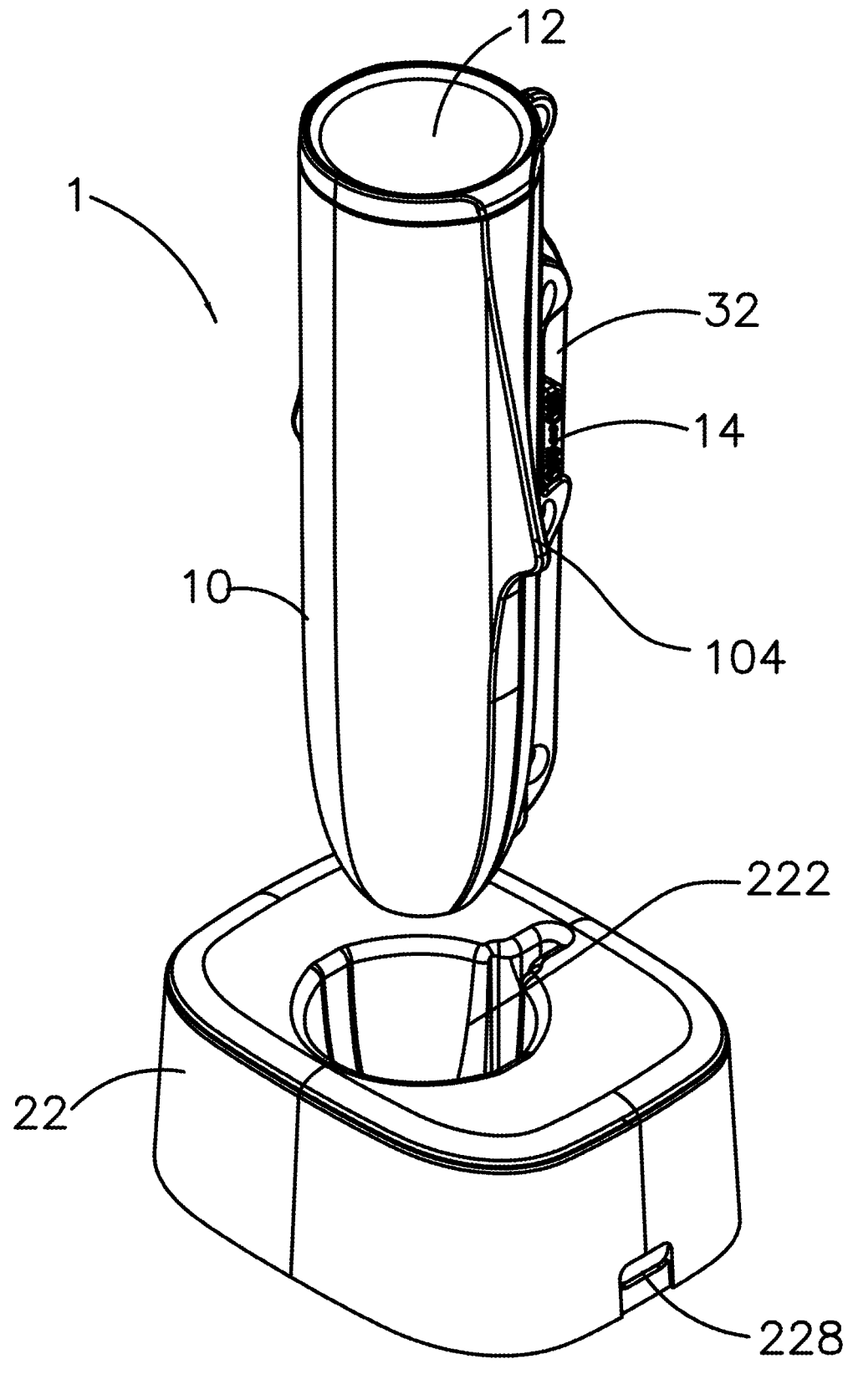
FIG. 10 is a perspective view of the underwater photographic device in FIG. 9 separated from the charging base.
Figure 11:
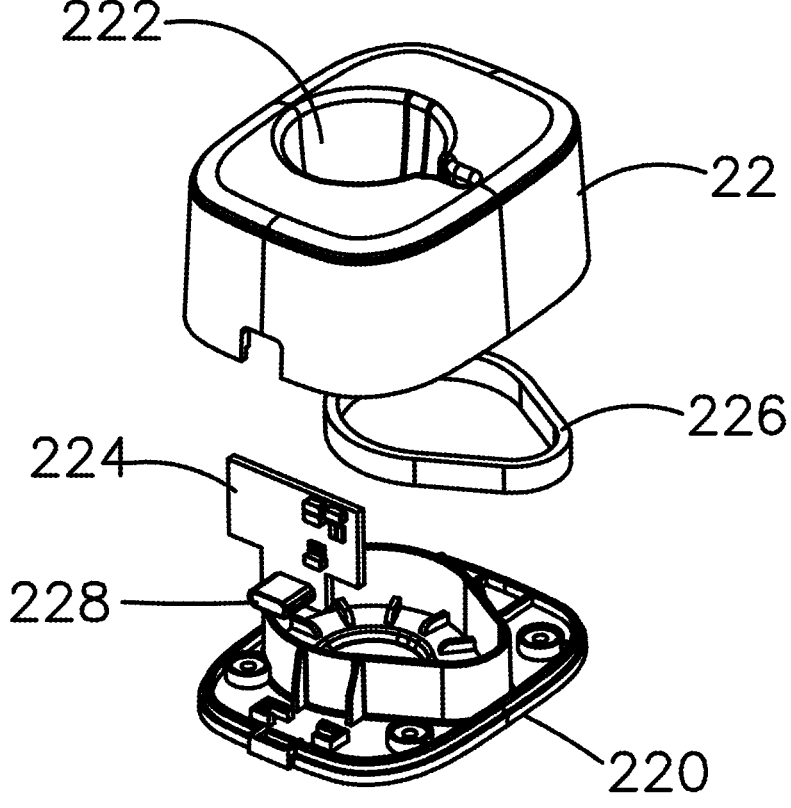
FIG. 11 is an exploded view of the charging base in FIG. 9.

The underwater photographic device 1 of the present disclosure further includes a charging base 22 for charging. As shown in FIGS. 9 to 11, the charging base 22 has a truncated cone-shaped structure. The top of the charging base 22 is recessed downward to form a receiving groove for receiving the underwater photographic device 1, and the bottom of the charging base 22 has an opening. The opening of the charging base 22 is covered with a bottom cover 220 to form an accommodation chamber. A charging circuit board 224 and a charging transmitting coil assembly 226 are provided in the accommodation chamber. A charging interface 228 is embedded in the side wall of the charging base 22. The charging transmitting coil assembly 226 and the charging interface 228 are electrically connected to the charging circuit board 224. The power end of the charging transmitting coil assembly 226 is connected to the external power source through the charging interface 228. The charging transmitting coil assembly 226 cooperates with the charging receiving coil assembly 200. The charging receiving coil assembly 200 can induce the electromagnetic signals transmitted by the charging transmitting coil assembly 226 to charge the storage battery 202.

Figure 12:
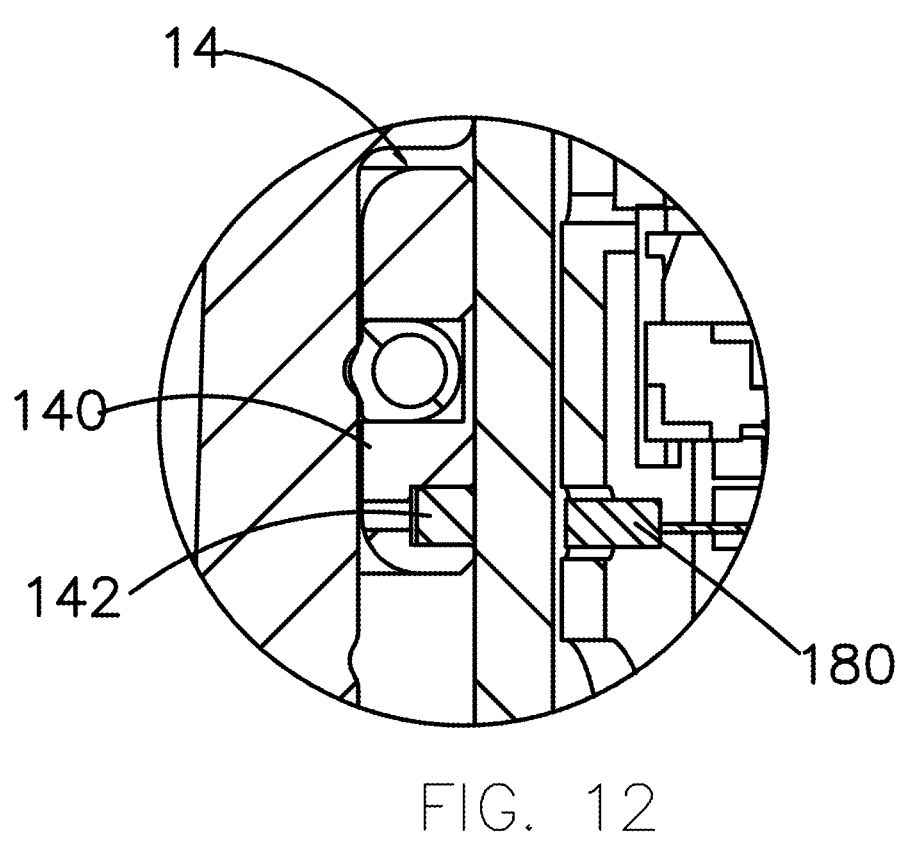
FIG. 12 is a partial cross-sectional view of an underwater photographic device according to a second embodiment.

FIG. 12 is a partial cross-sectional view of an underwater photographic device according to a second embodiment of the present disclosure. The structure of the underwater photographic device according to the second embodiment is basically the same as that of the underwater photographic device according to the first embodiment. The similarities between the two refer to the above description of the first embodiment, which will not be repeated again here. The difference between the second embodiment and the first embodiment is that the magnetic switch in the second embodiment has one magnet. As shown in FIG. 12, in this embodiment, the magnetic switch 14 includes a slider 140 and a magnet 142 disposed on the slider 140. The Hall sensor 180 outputs corresponding level signals to the control assembly according to the sensed changes in the magnetic field caused by the changes in the position of the magnetic switch 14. In this embodiment, the Hall sensor 180 mainly senses the changes in magnetic induction intensity caused by the magnetic switch 14 and opens or closes the circuit according to a preset magnetic induction intensity threshold.

Figure 13:
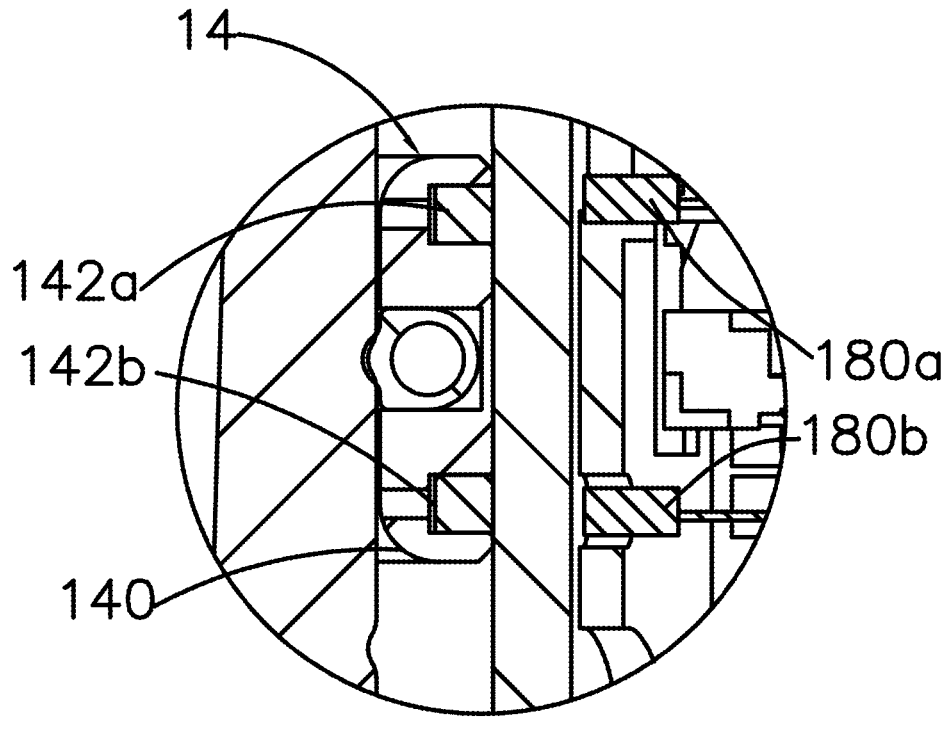
FIG. 13 is a partial cross-sectional view of an underwater photographic device according to a third embodiment.

FIG. 13 is a partial cross-sectional view of an underwater photographic device according to a third embodiment of the present disclosure. The structure of the underwater photographic device according to the third embodiment is basically the same as that of the underwater photographic device according to the first embodiment. The similarities between the two refer to the above description of the first embodiment, which will not be repeated again here. The difference between the third embodiment and the first embodiment is that there are two Hall sensors in the third embodiment: a first Hall sensor 180*a* and a second Hall sensor 180*b*. In the third embodiment, the magnetic switch 14 includes a slider 140 and a first magnet 142*a* and a second magnet 142*b* arranged sequentially in the sliding direction of the slider 140. The first magnet 142*a* and the second magnet 142*b* have opposite polarities. The first Hall sensor 180*a* and the second Hall sensor 180*b*, as circuit switches, can close or open the corresponding circuits by sensing the polarity changes of the first magnet 142*a* and the second magnet 142*b*. In this embodiment, the control assembly includes a first circuit, a second circuit and a third circuit. When the first Hall sensor 180*a* is triggered individually, the first circuit is closed. When the second Hall sensor 180*b* is triggered individually, the second circuit is closed. When the first Hall sensor 180*a* and the second Hall sensor 180*b* are triggered at the same time, the third circuit is closed.

Figure 14:
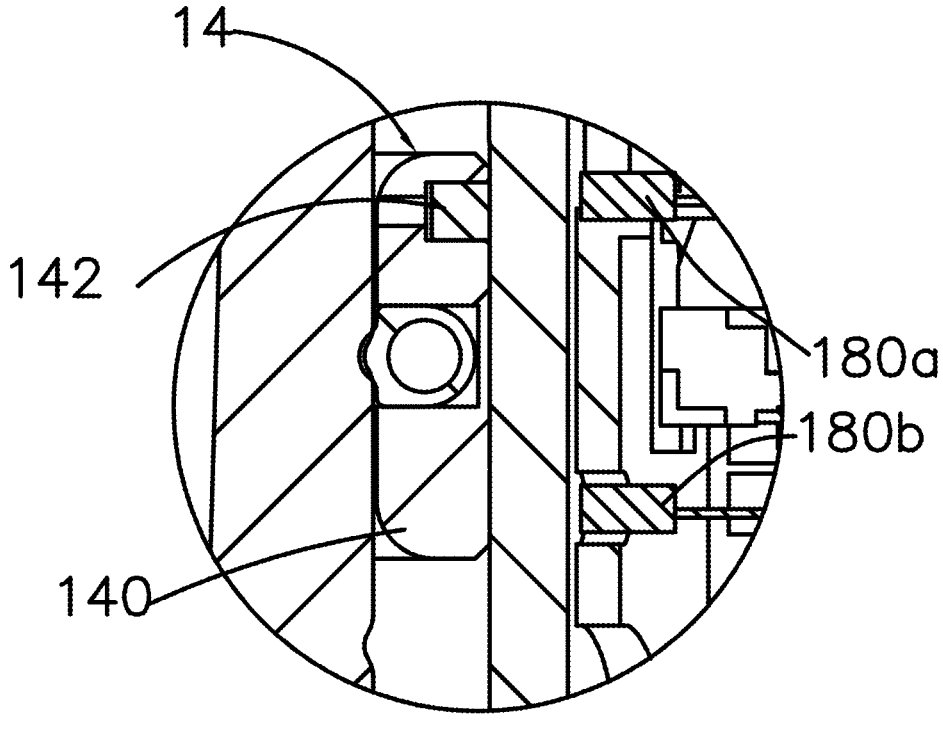
FIG. 14 is a partial cross-sectional view of an underwater photographic device according to a fourth embodiment.

FIG. 14 is a partial cross-sectional view of an underwater photographic device according to a fourth embodiment of the present disclosure. The structure of the underwater photographic device according to the fourth embodiment is basically the same as that of the underwater photographic device according to the first embodiment. The similarities between the two refer to the above description of the first embodiment, which will not be repeated again here. The difference between the fourth embodiment and the first embodiment is that there are two Hall sensors: a first Hall sensor 180*a* and a second Hall sensor 180*b*, and there is one magnet in the fourth embodiment. In this embodiment, the magnetic switch 14 includes a slider 140 and a magnet 142 disposed on the slider 140. The first Hall sensor 180*a* and the second Hall sensor 180*b*, as circuit switches, can open or close corresponding circuits by sensing the changes in magnetic induction intensity caused by the magnets 142. In this embodiment, the control assembly includes a first circuit and a second circuit. When the first Hall sensor 180*a* is triggered, the first circuit is closed. When the second Hall sensor 180*b* is triggered, the second circuit is closed.

The above embodiments are only preferred embodiments of the present disclosure, and do not limit the scope of the present disclosure. Without departing from the spirit of the present disclosure, those skilled in the art may make various modifications and developments to the technical solutions of the present disclosure, which all fall within the protection scope defined by the claims of the present disclosure.

The invention claimed is:

1. An underwater photographic device, comprising:
   a housing defining an accommodation chamber, the housing being a single piece and having opposite first and second ends, and the second end having an opening;
   a transparent window disposed at the opening of the housing and sealing the accommodation chamber;
   a magnetic switch slidably provided on an outside of the housing;
   a camera arranged in the accommodation chamber and adjacent to the opening;
   a battery assembly arranged in the accommodation chamber;
   a control assembly arranged in the accommodation chamber and electrically connected to the camera and the battery assembly, the control assembly comprising at least one Hall sensor, and the Hall sensor being configured to output level signals to the control assembly according to sensed changes in magnetic field caused by changes in position of the magnetic switch;
   a bracket defining a receiving chamber therein, the camera, the control assembly and the battery assembly being installed in the receiving chamber of the bracket and thus forming a pre-assembled unit with the bracket; and
   a screw, the screw being an exhaust screw, and the exhaust screw passing through the first end of the housing and fixedly connected to a corresponding end of the bracket.

2. The underwater photographic device of claim 1, wherein the magnetic switch comprises a slider and a magnet arranged on the slider, and the at least one Hall sensor consists of one Hall sensor which is configured to output level signals to the control assembly according to sensed changes in magnetic field caused by changes in position of the magnetic switch.

3. The underwater photographic device of claim 1, wherein the magnetic switch comprises a slider and a magnet arranged on the slider, and the at least one Hall sensor consists of at least two Hall sensors which are configured to output level signals to the control assembly according to sensed changes in magnetic field caused by changes in position of the magnetic switch respectively.

4. The underwater photographic device of claim 1, wherein the magnetic switch comprises a slider and a first magnet and a second magnet arranged sequentially in a sliding direction of the slider, the first magnet and the second magnet have opposite polarities, and the at least one Hall sensor consists of one Hall sensor which is configured to output level signals to the control assembly according to sensed changes in magnetic field caused by changes in polarity of the magnetic switch.

5. The underwater photographic device of claim 1, wherein the magnetic switch comprises a slider and a first magnet and a second magnet arranged sequentially in a sliding direction of the slider, the first magnet and the second magnet have opposite polarities, and the at least one Hall sensor consists of at least two Hall sensors which are configured to output level signals to the control assembly according to sensed changes in magnetic field caused by changes in polarity of the magnetic switch respectively.

6. The underwater photographic device of claim 1, wherein a connector is fixedly connected to the outside of the housing and configured to limit the magnetic switch, and the magnetic switch is slidable relative to the housing and the connector.

7. The underwater photographic device of claim 1, wherein the bracket comprises a first bracket part and a second bracket part snapped with each other and defining the receiving chamber, and the camera, the control assembly and the battery assembly are sequentially arranged in the receiving chamber in an axial direction of the bracket.

8. The underwater photographic device of claim 1, wherein the transparent window is snap-connected to an other end of the bracket.

9. The underwater photographic device of claim 1, wherein the transparent window is snap-connected to the second end of the housing.

10. The underwater photographic device of claim 1, wherein a first sealing member is provided between the bracket and the housing, a second sealing member is provided between the housing and the transparent window, and a third sealing member is provided between the exhaust screw and the bracket.

11. The underwater photographic device of claim 1, wherein the housing is bullet-shaped and has fins on opposite sides of an outer surface thereof.

12. The underwater photographic device of claim 1, wherein the control assembly comprises a main circuit board and an auxiliary circuit board arranged in parallel and spaced apart in a radial direction of the bracket, the main circuit board and the auxiliary circuit board are electrically connected, the camera and the Hall sensor are electrically connected to the main control circuit board, and the battery assembly is electrically connected to the auxiliary circuit board.

13. An underwater photographic device, comprising:
a housing defining an accommodation chamber, the housing being a single piece and having opposite first and second ends, and the second end having an opening;
a transparent window disposed at the opening of the housing and sealing the accommodation chamber;
a magnetic switch slidably provided on an outside of the housing;
a camera arranged in the accommodation chamber and adjacent to the opening;
a battery assembly arranged in the accommodation chamber; and
a control assembly arranged in the accommodation chamber and electrically connected to the camera and the battery assembly, the control assembly comprising at least one Hall sensor, and the Hall sensor being configured to output level signals to the control assembly according to sensed changes in magnetic field caused by changes in position of the magnetic switch,
wherein a connector is fixedly connected to the outside of the housing and configured to limit the magnetic switch, and the magnetic switch is slidable relative to the housing and the connector; and
wherein a first groove is defined on a side of the connector opposite to the outside of the housing for accommodating the magnetic switch, the magnetic switch defines a second groove extending in a longitudinal direction of the housing and extending through the magnetic switch in the longitudinal direction of the housing, the magnetic switch has a length shorter than that of the first groove, and a bottom edge of the connector corresponding to the first groove is embedded in the second groove of the magnetic switch so that the magnetic switch is slidable in the first groove.

14. The underwater photographic device of claim 13, wherein the magnetic switch is provided with an elastic protrusion on a bottom wall of the second groove, the connector is provided with limiting recesses on a bottom wall of the first groove, the limiting recesses has a quantity greater than that of the Hall sensor, and positions of the limiting recesses correspond to preset positions of the magnetic switch for triggering the Hall sensor.

15. An underwater photographic device, comprising:
a housing defining an accommodation chamber, the housing being a single piece and having opposite first and second ends, and the second end having an opening;
a transparent window disposed at the opening of the housing and sealing the accommodation chamber;
a magnetic switch slidably provided on an outside of the housing;
a camera arranged in the accommodation chamber and adjacent to the opening;
a battery assembly arranged in the accommodation chamber; and
a control assembly arranged in the accommodation chamber and electrically connected to the camera and the battery assembly, the control assembly comprising at least one Hall sensor, and the Hall sensor being configured to output level signals to the control assembly according to sensed changes in magnetic field caused by changes in position of the magnetic switch,
wherein the control assembly comprises a main circuit board and an auxiliary circuit board arranged in parallel and spaced apart in a radial direction of the bracket, the main circuit board and the auxiliary circuit board are electrically connected, the camera and the Hall sensor are electrically connected to the main control circuit board, and the battery assembly is electrically connected to the auxiliary circuit board; and
wherein the camera comprises a lens and a light board disposed between the lens and the transparent window, the light board is electrically connected to the main circuit board, the light board is provided with a fill light and an indicator light, a shielding member is provided between the light board and the transparent window, the shielding member is provided with light-transmitting holes corresponding to the fill light and the indicator light to allow light from the fill light and the indicator light to pass through.

16. An underwater photographic device, comprising:
a housing defining an accommodation chamber, the housing being a single piece and having opposite first and second ends, and the second end having an opening;

a transparent window disposed at the opening of the housing and sealing the accommodation chamber;

a magnetic switch slidably provided on an outside of the housing;

a camera arranged in the accommodation chamber and adjacent to the opening;

a battery assembly arranged in the accommodation chamber; and a control assembly arranged in the accommodation chamber and electrically connected to the camera and the battery assembly, the control assembly comprising at least one Hall sensor, and the Hall sensor being configured to output level signals to the control assembly according to sensed changes in magnetic field caused by changes in position of the magnetic switch, wherein the control assembly comprises a main circuit board and an auxiliary circuit board arranged in parallel and spaced apart in a radial direction of the bracket, the main circuit board and the auxiliary circuit board are electrically connected, the camera and the Hall sensor are electrically connected to the main control circuit board, and the battery assembly is electrically connected to the auxiliary circuit board; and wherein the battery assembly is a wireless charging assembly and comprises a charging receiving coil assembly and a battery, and the charging receiving coil assembly and the battery are respectively electrically connected to the auxiliary circuit board so that the charging receiving coil assembly is allowed to charge the battery.

17. The underwater photographic device of claim 16, further comprising a charging base, and a charging circuit board, a charging transmitting coil assembly, and a charging interface being provided in the charging base, wherein the charging transmitting coil assembly and the charging interface are electrically connected to the charging circuit board, and a power end of the charging transmitting coil assembly is configured to be connected to an external power supply through the charging interface; and the charging base defines a receiving groove on a surface thereof for receiving the housing, the charging transmitting coil assembly is configured to cooperate with the charging receiving coil assembly of the battery assembly, and the charging receiving coil assembly is configured to sense electromagnetic signals transmitted by the charging transmitting coil assembly to charge the battery.

18. An underwater photographic device, comprising:

a housing defining an accommodation chamber, the housing being a single piece and having opposite first and second ends, and the second end having an opening;

a transparent window disposed at the opening of the housing and sealing the accommodation chamber;

a magnetic switch slidably provided on an outside of the housing;

a camera arranged in the accommodation chamber and adjacent to the opening;

a battery assembly arranged in the accommodation chamber; and a control assembly arranged in the accommodation chamber and electrically connected to the camera and the battery assembly, the control assembly comprising at least one Hall sensor, and the Hall sensor being configured to output level signals to the control assembly according to sensed changes in magnetic field caused by changes in position of the magnetic switch, wherein the magnetic switch comprises a slider and a magnet arranged on the slider, and the at least one Hall sensor consists of at least two Hall sensors which are configured to output level signals to the control assembly according to sensed changes in magnetic field caused by changes in position of the magnetic switch respectively.

19. An underwater photographic device, comprising:

a housing defining an accommodation chamber, the housing being a single piece and having opposite first and second ends, and the second end having an opening;

a transparent window disposed at the opening of the housing and sealing the accommodation chamber;

a magnetic switch slidably provided on an outside of the housing;

a camera arranged in the accommodation chamber and adjacent to the opening;

a battery assembly arranged in the accommodation chamber; and a control assembly arranged in the accommodation chamber and electrically connected to the camera and the battery assembly, the control assembly comprising at least one Hall sensor, and the Hall sensor being configured to output level signals to the control assembly according to sensed changes in magnetic field caused by changes in position of the magnetic switch, wherein the magnetic switch comprises a slider and a first magnet and a second magnet arranged sequentially in a sliding direction of the slider, the first magnet and the second magnet have opposite polarities, and the at least one Hall sensor consists of one Hall sensor which is configured to output level signals to the control assembly according to sensed changes in magnetic field caused by changes in polarity of the magnetic switch.

20. An underwater photographic device, comprising:

a housing defining an accommodation chamber, the housing being a single piece and having opposite first and second ends, and the second end having an opening;

a transparent window disposed at the opening of the housing and sealing the accommodation chamber;

a magnetic switch slidably provided on an outside of the housing;

a camera arranged in the accommodation chamber and adjacent to the opening;

a battery assembly arranged in the accommodation chamber; and a control assembly arranged in the accommodation chamber and electrically connected to the camera and the battery assembly, the control assembly comprising at least one Hall sensor, and the Hall sensor being configured to output level signals to the control assembly according to sensed changes in magnetic field caused by changes in position of the magnetic switch, wherein the magnetic switch comprises a slider and a first magnet and a second magnet arranged sequentially in a sliding direction of the slider, the first magnet and the second magnet have opposite polarities, and the at least one Hall sensor consists of at least two Hall sensors which are configured to output level signals to the control assembly according to sensed changes in magnetic field caused by changes in polarity of the magnetic switch respectively.

* * * * *